(12) United States Patent
Shi et al.

(10) Patent No.: US 10,472,899 B2
(45) Date of Patent: Nov. 12, 2019

(54) CUTTING TOOLS WITH ROTATING ELEMENTS

(71) Applicant: Smith International, Inc., Houston, TX (US)

(72) Inventors: Jibin Shi, Spring, TX (US); Youhe Zhang, Spring, TX (US)

(73) Assignee: Smith International, Inc., Houston, TX (US)

(*) Notice: Subject to any disclaimer, the term of this patent is extended or adjusted under 35 U.S.C. 154(b) by 37 days.

(21) Appl. No.: 15/473,168

(22) Filed: Mar. 29, 2017

(65) Prior Publication Data

US 2017/0204673 A1 Jul. 20, 2017

Related U.S. Application Data

(63) Continuation of application No. 14/363,266, filed as application No. PCT/US2012/067685 on Dec. 4, 2012, now abandoned.

(60) Provisional application No. 61/566,859, filed on Dec. 5, 2011.

(51) Int. Cl.
| | |
|---|---|
| *E21B 10/573* | (2006.01) |
| *E21B 10/46* | (2006.01) |
| *E21B 10/43* | (2006.01) |
| *B23P 15/28* | (2006.01) |
| *E21B 10/08* | (2006.01) |

(52) U.S. Cl.
CPC ............ *E21B 10/573* (2013.01); *B23P 15/28* (2013.01); *E21B 10/08* (2013.01); *E21B 10/43* (2013.01); *E21B 10/46* (2013.01)

(58) Field of Classification Search
CPC ........ E21B 10/573; E21B 10/43; E21B 10/46; E21B 10/08; E21B 10/633; E21B 10/624
See application file for complete search history.

(56) References Cited

U.S. PATENT DOCUMENTS

| | | | |
|---|---|---|---|
| 4,104,344 A | | 8/1978 | Pope et al. |
| 4,288,248 A | | 9/1981 | Bovenkerk et al. |
| 4,553,615 A | | 11/1985 | Grainger |
| 4,632,463 A | | 12/1986 | Stewerf, Jr. |
| 4,654,947 A | * | 4/1987 | Davis ........................ B23C 5/22 175/383 |
| 5,127,923 A | | 7/1992 | Bunting et al. |
| 5,423,719 A | | 6/1995 | Jennings |

(Continued)

FOREIGN PATENT DOCUMENTS

| | | | | |
|---|---|---|---|---|
| CA | 2944868 A1 | * | 11/2015 | ............. E21B 10/62 |
| CN | 202017456 U | | 10/2011 | |

(Continued)

OTHER PUBLICATIONS

Trenchless Pedia, "Outer Diameter", https://www.trenchlesspedia.com/definition/3625/outer-diameter-od, 2 pages (Year: 2019).*

(Continued)

*Primary Examiner* — Jennifer H Gay

(57) ABSTRACT

A cutting tool has a tool body, a plurality of blades extending radially from the tool body, at least one pocket in the plurality of blades, and at least one rolling element in the at least one pocket. The cutting tool may be a drill bit, with at least one rolling element in a pocket in a blade of the drill bit and at least partially exposed to the formation to be drilled.

20 Claims, 13 Drawing Sheets

(56) References Cited

U.S. PATENT DOCUMENTS

| | | |
|---|---|---|
| 5,678,645 A | 10/1997 | Tibbitts et al. |
| 5,975,811 A | 11/1999 | Briese |
| 7,070,011 B2 | 7/2006 | Sherwood, Jr. et al. |
| 7,594,554 B2 | 9/2009 | Schwefe et al. |
| 7,604,073 B2 | 10/2009 | Cooley et al. |
| 7,703,559 B2* | 4/2010 | Shen .................. E21B 10/5673 |
| | | 175/426 |
| 7,762,359 B1 | 7/2010 | Miess |
| 7,942,218 B2 | 5/2011 | Cooley et al. |
| 8,011,456 B2 | 9/2011 | Sherwood, Jr. |
| 8,061,452 B2 | 11/2011 | Cooley et al. |
| 8,079,431 B1* | 12/2011 | Cooley .................. E21B 10/55 |
| | | 175/432 |
| 8,091,655 B2 | 1/2012 | Shen et al. |
| 8,338,915 B2 | 12/2012 | Mallikararjunaswamy et al. |
| 8,499,859 B1* | 8/2013 | Cooley .................. E21B 10/55 |
| | | 175/382 |
| 8,800,691 B2* | 8/2014 | Shen .................. E21B 10/5673 |
| | | 175/426 |
| 8,973,686 B2* | 3/2015 | Dolan .................. E21B 10/633 |
| | | 175/428 |
| 9,187,962 B2* | 11/2015 | Burhan .................. E21B 10/54 |
| 9,291,000 B2* | 3/2016 | Zhang .................. E21B 10/50 |
| 9,322,219 B2* | 4/2016 | Burhan .................. E21B 10/46 |
| 9,605,486 B2* | 3/2017 | Burhan .................. E21B 10/50 |
| 9,739,097 B2* | 8/2017 | Zhang .................. E21B 10/573 |
| 9,976,353 B2* | 5/2018 | Hinz .................. E21B 10/14 |
| 9,976,356 B2* | 5/2018 | Burhan .................. E21B 10/567 |
| 2002/0062996 A1* | 5/2002 | Dvorachek ............ E21B 10/43 |
| | | 175/428 |
| 2003/0037964 A1 | 2/2003 | Sinor et al. |
| 2007/0278017 A1 | 12/2007 | Shen et al. |
| 2008/0236900 A1 | 10/2008 | Cooley et al. |
| 2009/0173014 A1 | 7/2009 | Voronin et al. |
| 2010/0012389 A1 | 1/2010 | Zhang et al. |
| 2010/0108403 A1 | 5/2010 | Keshavan |
| 2010/0219001 A1 | 9/2010 | Shen et al. |
| 2010/0314176 A1 | 12/2010 | Zhang et al. |
| 2011/0031031 A1 | 2/2011 | Vempati et al. |
| 2011/0088955 A1 | 4/2011 | Cooley et al. |
| 2011/0114393 A1 | 5/2011 | Dolan et al. |
| 2011/0284293 A1* | 11/2011 | Shen .................. E21B 10/006 |
| | | 175/338 |
| 2011/0297454 A1 | 12/2011 | Shen et al. |
| 2012/0132471 A1 | 5/2012 | Zhang et al. |
| 2012/0273280 A1 | 11/2012 | Zhang et al. |
| 2013/0140094 A1 | 6/2013 | Burhan et al. |
| 2013/0146367 A1 | 6/2013 | Zhang et al. |
| 2013/0220707 A1* | 8/2013 | Shen .................. E21B 10/5673 |
| | | 175/432 |
| 2013/0333953 A1* | 12/2013 | Zhang .................. E21B 10/633 |
| | | 175/428 |
| 2014/0174834 A1* | 6/2014 | Zhang .................. E21B 10/573 |
| | | 175/432 |
| 2014/0326515 A1 | 11/2014 | Shi et al. |
| 2014/0360792 A1 | 12/2014 | Azar et al. |
| 2014/0367174 A1 | 12/2014 | Siracki |
| 2014/0374169 A1 | 12/2014 | Cariveau et al. |
| 2016/0153243 A1* | 6/2016 | Hinz .................. E21B 10/43 |
| | | 175/57 |
| 2016/0273273 A1* | 9/2016 | Hinz .................. E21B 10/43 |
| 2017/0204673 A1* | 7/2017 | Shi .................. E21B 10/573 |
| 2018/0010396 A1* | 1/2018 | Dunbar .................. E21B 10/573 |

FOREIGN PATENT DOCUMENTS

| | | |
|---|---|---|
| GB | 2385350 A | 8/2003 |
| GB | 2445432 A | 7/2008 |
| WO | WO2010009416 A2 | 1/2010 |

OTHER PUBLICATIONS

International Search Report and Written Opinion issued in International application PCT/US2012/067685 dated Jan. 30, 2013, 13 pages.

International Preliminary Report on Patentability issued in International application PCT/US2012/067685 dated Jun. 19, 2014, 9 pages.

International Search Report and Written Opinion issued in International application PCT/US2012/071701 dated Apr. 25, 2013, 15 pages.

International Preliminary Report on Patentability issued in International application PCT/US2012/071701 dated Jul. 1, 2014, 10 pages.

First Office Action and Search report issued in Chinese application 201280070866.9 dated Sep. 6, 2015, 25 pages.

Second Office Action issued in Chinese application 201280070866.9 dated May 4, 2016, 6 pages.

Office Action issued in U.S. Appl. No. 14/369,583 dated Jan. 13, 2017, 12 pages.

* cited by examiner

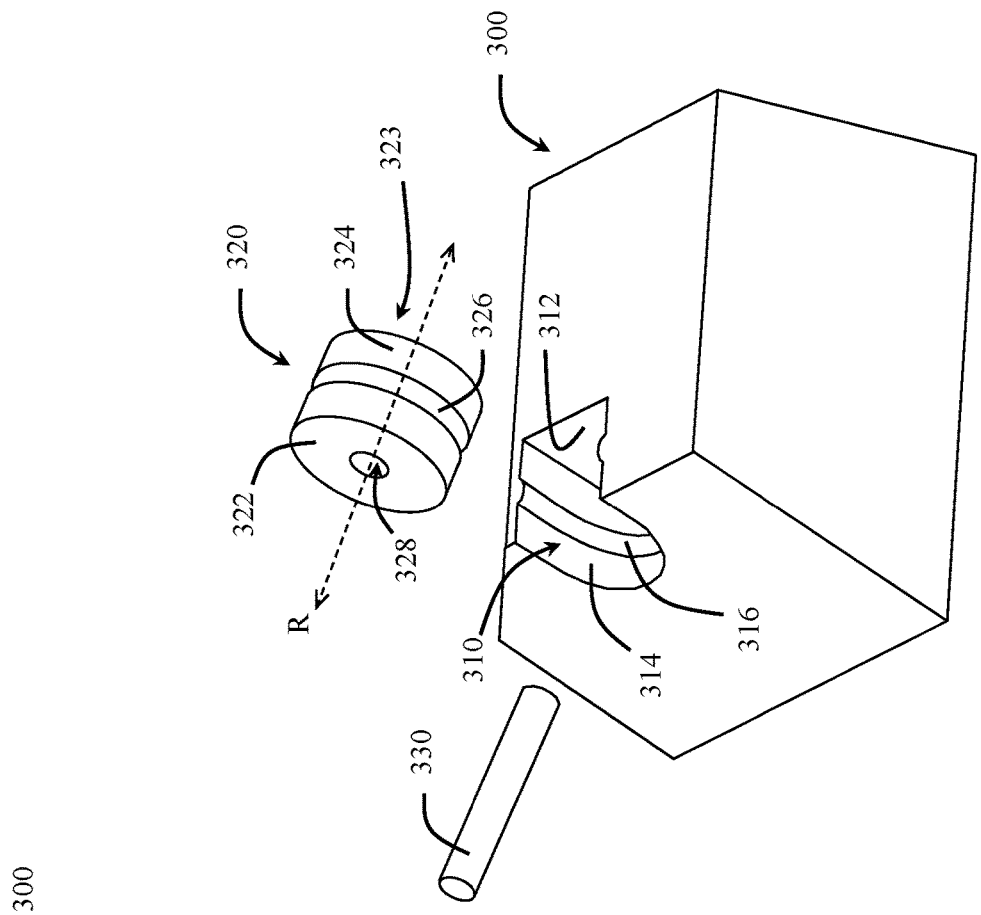
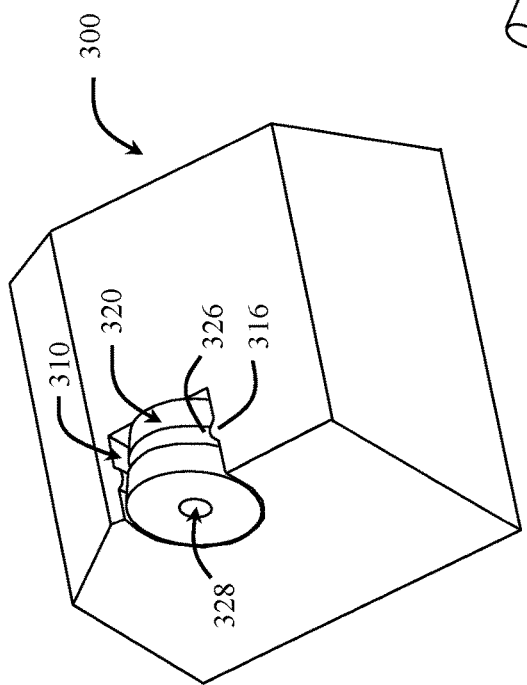
FIG. 3
FIG. 4

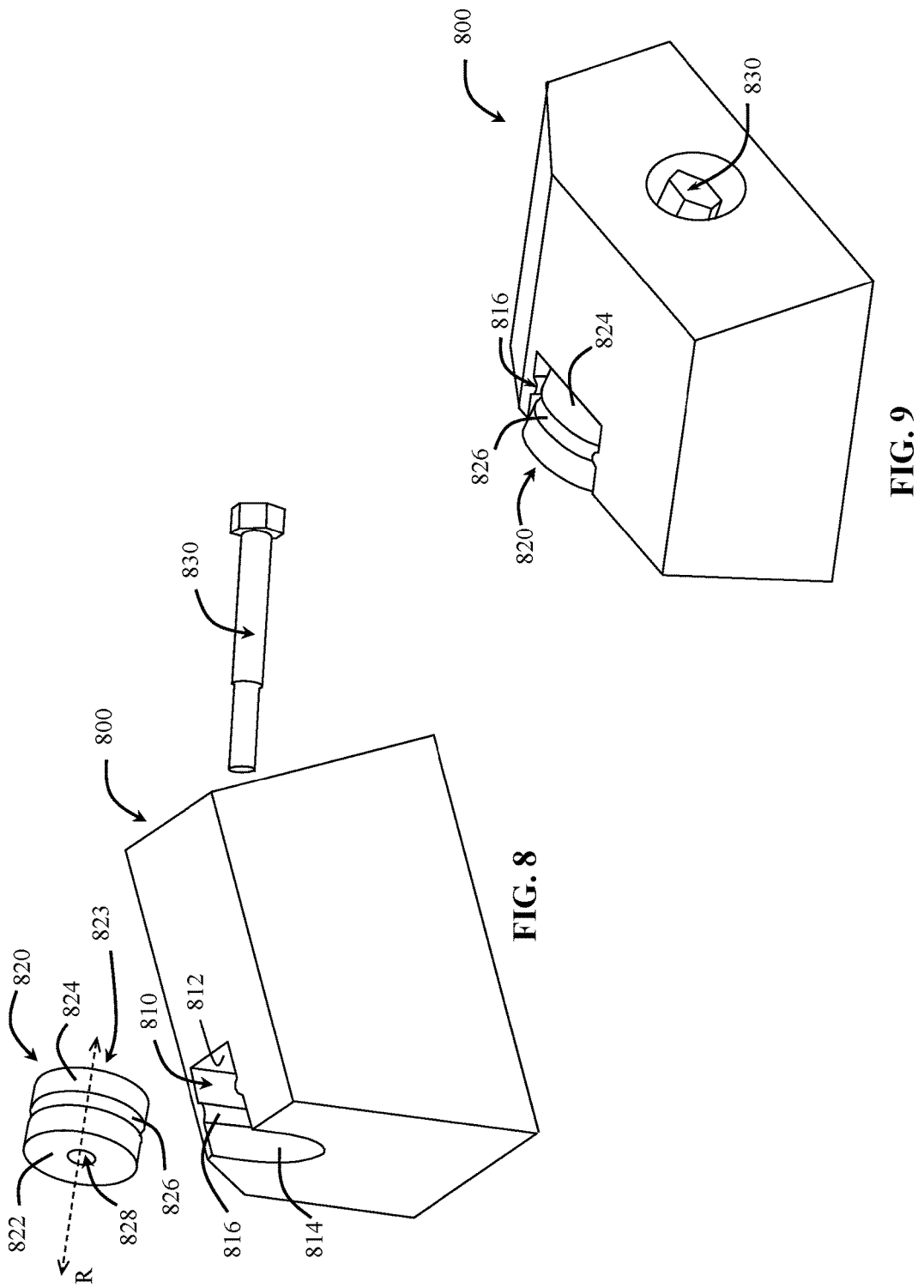

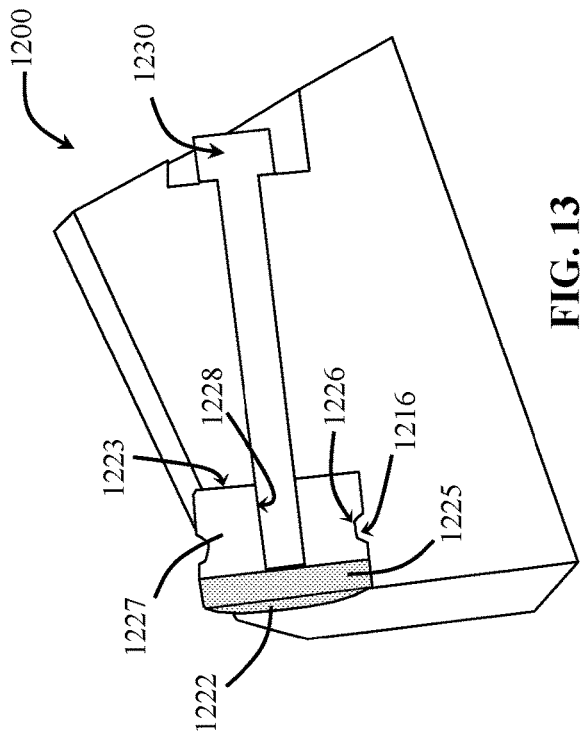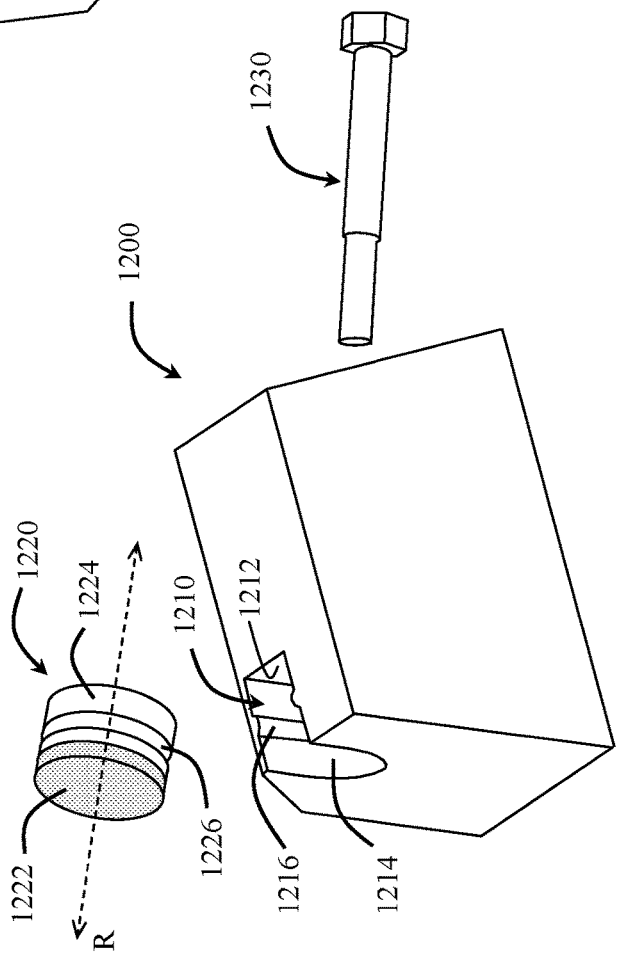

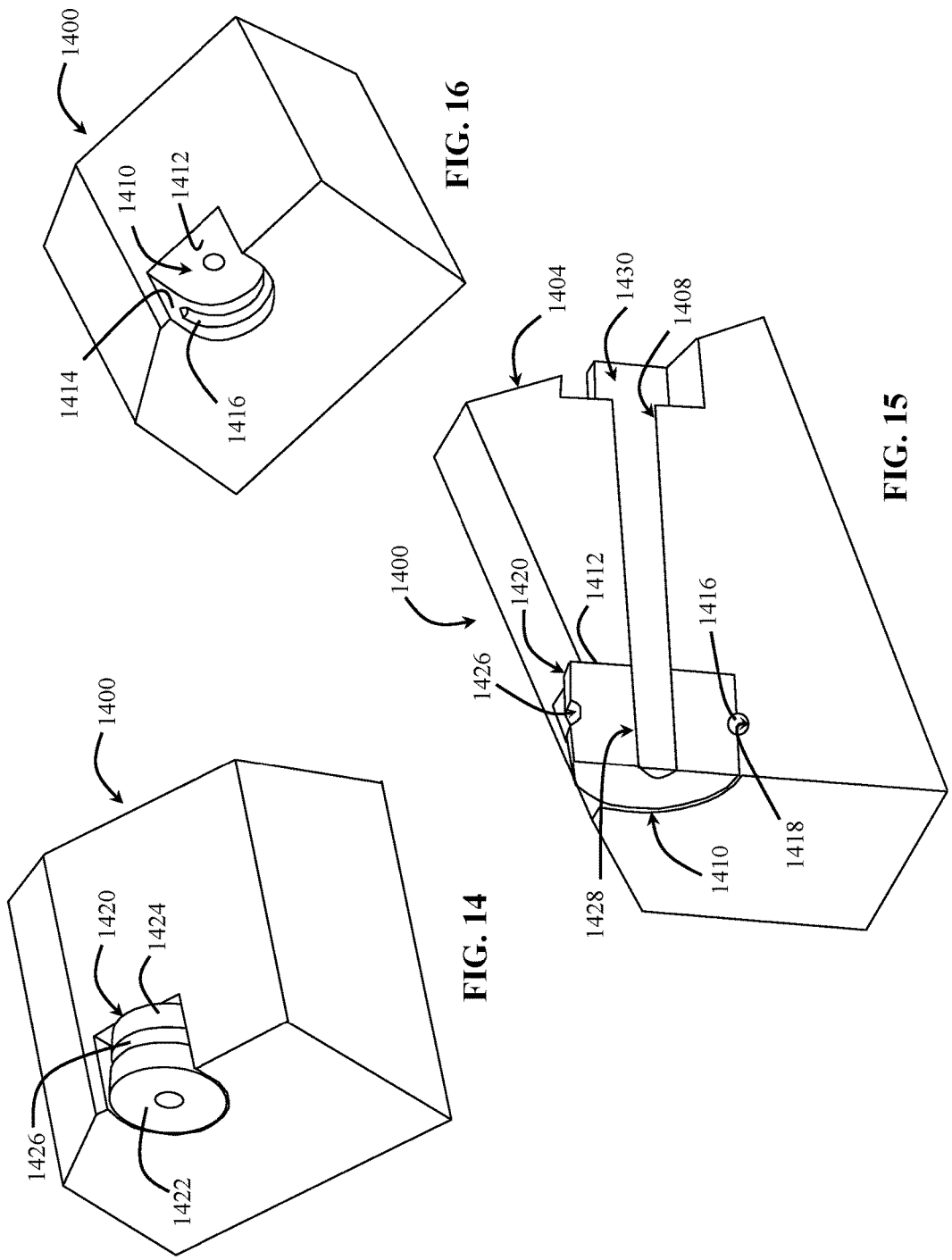

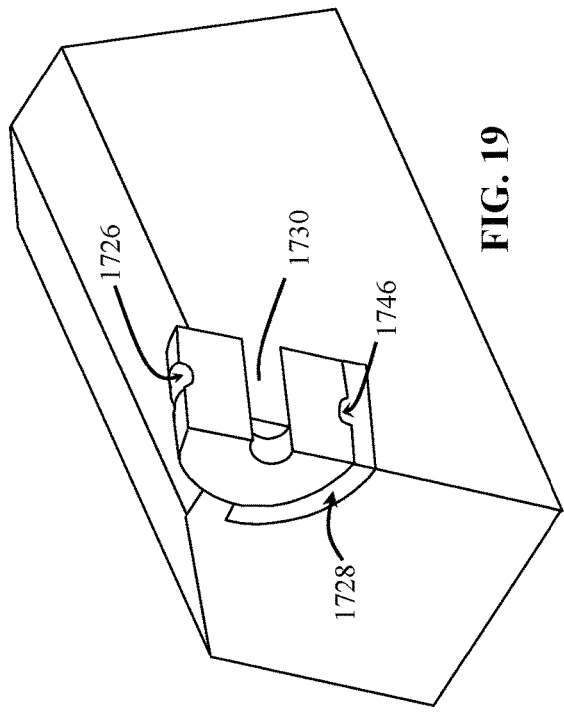
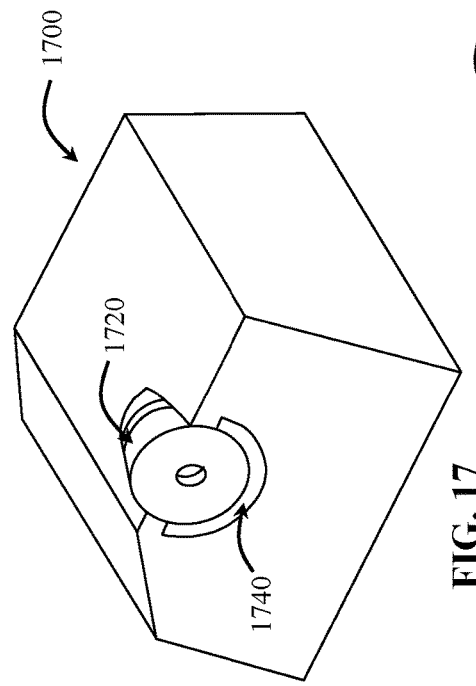
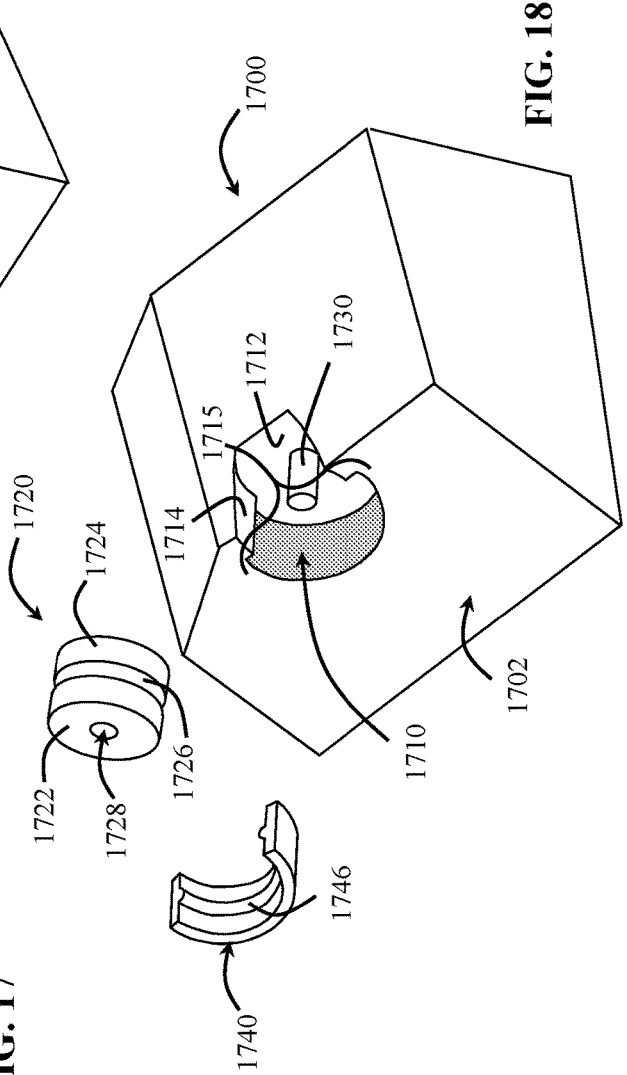
FIG. 17
FIG. 18
FIG. 19

CUTTING TOOLS WITH ROTATING ELEMENTS

RELATED APPLICATIONS

This application is a continuation application of U.S. patent Ser. No. 14/363,266, which has a filing date of Dec. 4, 2012 and entered the U.S. on Jun. 5, 2014, which is a national stage application of PCT/US/2012/067685, filed on Dec. 4, 2012, which claims the benefit of U.S. Provisional Application Ser. No. 61/566,859, filed Dec. 5, 2011. Each of the foregoing is incorporated by reference herein in its entirety.

BACKGROUND

Technical Field

Embodiments disclosed herein relate generally to cutting elements for drill bits or other tools incorporating the same. More specifically, embodiments disclosed herein relate generally to rotatable cutting elements for rotary drill bits.

Background Art

Drill bits used to drill wellbores through earth formations generally are made within one of two broad categories of bit structures. Depending on the application/formation to be drilled, the appropriate type of drill bit may be selected based on the cutting action type for the bit and its appropriateness for use in the particular formation. Drill bits in the first category are generally known as "roller cone" bits, which include a bit body having one or more roller cones rotatably mounted to the bit body. The bit body is typically formed from steel or another high strength material. The roller cones are also typically formed from steel or other high strength material and include a plurality of cutting elements disposed at selected positions about the cones. The cutting elements may be formed from the same base material as is the cone. These bits are typically referred to as "milled tooth" bits. Other roller cone bits include "insert" cutting elements that are press (interference) fit into holes formed and/or machined into the roller cones. The inserts may be formed from, for example, tungsten carbide, natural or synthetic diamond, boron nitride, or any one or combination of hard or superhard materials.

Drill bits of the second category are typically referred to as "fixed cutter" or "drag" bits. Drag bits, include bits that have cutting elements attached to the bit body, which may be a steel bit body or a matrix bit body formed from a matrix material such as tungsten carbide surrounded by a binder material. Drag bits may generally be defined as bits that have no moving parts. However, there are different types and methods of forming drag bits that are known in the art. For example, drag bits having abrasive material, such as diamond, impregnated into the surface of the material, which forms the bit body are commonly referred to as "impreg" bits. Drag bits having cutting elements made of an ultra hard cutting surface layer or "table" (typically made of polycrystalline diamond material or polycrystalline boron nitride material) deposited onto or otherwise bonded to a substrate are known in the art as polycrystalline diamond compact ("PDC") bits.

PDC bits drill soft formations easily, but they are frequently used to drill moderately hard or abrasive formations. They cut rock formations with a shearing action using small cutters that do not penetrate deeply into the formation. Because the penetration depth is shallow, high rates of penetration are achieved through relatively high bit rotational velocities.

PDC cutters have been used in industrial applications including rock drilling and metal machining for many years. In PDC bits, PDC cutters are received within cutter pockets, which are formed within blades extending from a bit body, and are typically bonded to the blades by brazing to the inner surfaces of the cutter pockets. The PDC cutters are positioned along the leading edges of the bit body blades so that as the bit body is rotated, the PDC cutters engage and drill the earth formation. In use, high forces may be exerted on the PDC cutters, particularly in the forward-to-rear direction. Additionally, the bit and the PDC cutters may be subjected to substantial abrasive forces. In some instances, impact, vibration, and erosive forces have caused drill bit failure due to loss of one or more cutters, or due to breakage of the blades.

In a typical PDC cutter, a compact of polycrystalline diamond ("PCD") (or other superhard material, such as polycrystalline cubic boron nitride) is bonded to a substrate material, which is typically a sintered metal-carbide to form a cutting structure. PCD comprises a polycrystalline mass of diamond grains or crystals that are bonded together to form an integral, tough, high-strength mass or lattice. The resulting PCD structure produces enhanced properties of wear resistance and hardness, making PCD materials extremely useful in aggressive wear and cutting applications where high levels of wear resistance and hardness are desired.

An example of a prior art PDC bit having a plurality of cutters with ultra hard working surfaces is shown in FIGS. 1 and 2. The drill bit 100 includes a bit body 110 having a threaded upper pin end 111 and a cutting end 115. The cutting end 115 typically includes a plurality of ribs or blades 120 arranged about the rotational axis L (also referred to as the longitudinal or central axis) of the drill bit and extending radially outward from the bit body 110. Cutting elements, or cutters, 150 are embedded in the blades 120 at predetermined angular orientations and radial locations relative to a working surface and with a desired back rake angle and side rake angle against a formation to be drilled.

A plurality of orifices 116 are positioned on the bit body 110 in the areas between the blades 120, which may be referred to as "gaps" or "fluid courses." The orifices 116 are commonly adapted to accept nozzles. The orifices 116 allow drilling fluid to be discharged through the bit in selected directions and at selected rates of flow between the blades 120 for lubricating and cooling the drill bit 100, the blades 120 and the cutters 150. The drilling fluid also cleans and removes the cuttings as the drill bit 100 rotates and penetrates the geological formation. Without proper flow characteristics, insufficient cooling of the cutters 150 may result in cutter failure during drilling operations. The fluid courses are positioned to provide additional flow channels for drilling fluid and to provide a passage for formation cuttings to travel past the drill bit 100 toward the surface of a wellbore (not shown).

Referring to FIG. 2, a top view of a prior art PDC bit is shown. The cutting face 118 of the bit shown includes a plurality of blades 120, wherein each blade has a leading side 122 facing the direction of bit rotation, a trailing side 124 (opposite from the leading side), and a top side 126. Each blade includes a plurality of cutting elements or cutters generally disposed radially from the center of cutting face 118 to generally form rows. Certain cutters, although at differing axial positions, may occupy radial positions that are in similar radial position to other cutters on other blades.

Cutters are conventionally attached to a drill bit or other downhole tool by a brazing process. In the brazing process, a braze material is positioned between the cutter and the cutter pocket. The material is melted and, upon subsequent solidification, bonds (attaches) the cutter in the cutter pocket. Selection of braze materials depends on their respective melting temperatures, to avoid excessive thermal exposure (and thermal damage) to the diamond layer prior to the bit (and cutter) even being used in a drilling operation. Specifically, alloys suitable for brazing cutting elements with diamond layers thereon have been limited to only a couple of alloys which offer low enough brazing temperatures to avoid damage to the diamond layer and high enough braze strength to retain cutting elements on drill bits.

Cracking (and/or formation of micro-cracks) in the bit body can also occur during the cutter brazing process in the area surrounding the cutter pockets. The formation and propagation of cracks in the matrix body during the drilling process may result in the loss of one or more PDC cutters. A lost cutter may abrade against the bit, causing further accelerated bit damage.

A significant factor in determining the longevity of PDC cutters is the exposure of the cutter to heat. Conventional polycrystalline diamond is stable at temperatures of up to 700-750° C. in air, above which observed increases in temperature may result in permanent damage to and structural failure of polycrystalline diamond. This deterioration in polycrystalline diamond is due to the significant difference in the coefficient of thermal expansion of the binder material, cobalt, as compared to diamond. Upon heating of polycrystalline diamond, the cobalt and the diamond lattice will expand at different rates, which may cause cracks to form in the diamond lattice structure and result in deterioration of the polycrystalline diamond. Damage may also be due to graphitization at diamond-diamond necks leading to loss of microstructural integrity and strength loss, at extremely high temperatures.

Exposure to heat (through brazing or through frictional heat generated from the contact of the cutter with the formation) can cause thermal damage to the diamond table and eventually result in the formation of cracks (due to differences in thermal expansion coefficients) which can lead to spalling of the polycrystalline diamond layer, delamination between the polycrystalline diamond and substrate, and conversion of the diamond back into graphite causing rapid abrasive wear. As a cutting element contacts the formation, a wear flat develops and frictional heat is induced. As the cutting element continues to be used, the wear flat will increase in size and further induce frictional heat. The heat may build-up that may cause failure of the cutting element due to thermal mismatch between diamond and catalyst discussed above. This is particularly true for cutters that are immovably attached to the drill bit, as conventional in the art.

Accordingly, there exists a continuing need to develop ways to extend the life of a cutting element.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a drill bit having a bit body, a plurality of blades extending radially from the bit body, at least one rolling cutter pocket disposed on the plurality of blades, and at least one rolling cutter, wherein each rolling cutter is disposed in one of the rolling cutter pockets, and wherein a side surface of the rolling cutter pocket and an outer circumferential surface of the rolling cutter have at least one mating lip and channel formed therein. Each rolling cutter includes a cavity extending at least partially along a rotational axis through the rolling cutter, from a bottom surface of the rolling cutter, and a retention pin disposed within the cavity.

In another aspect, embodiments disclosed herein relate to a method of manufacturing a drill bit that includes forming a bit body having a threaded pin end and a cutting end, wherein at least one blade extends radially from the bit body, and wherein the blade has at least one rolling cutter pocket formed therein, and placing a rolling cutter into the rolling cutter pocket, wherein the rolling cutter has an outer circumferential surface and a cavity extending at least partially along a rotational axis from a bottom surface of the rolling cutter through the rolling cutter, wherein a side surface of the rolling cutter pocket and the outer circumferential surface of the rolling cutter have at least one mating lip and channel formed therein, and wherein the rolling cutter is retained in the rolling cutter pocket by a retention pin disposed within the cavity.

Other aspects and advantages of the invention will be apparent from the following description and the appended claims.

BRIEF DESCRIPTION OF DRAWINGS

Embodiments of Rotating Cutting Elements for PDC Bits are described with reference to the following figures. The same numbers are used throughout the figures to reference like features and components.

FIG. 3 shows a rolling cutter, a rolling cutter pocket, and a retention pin according to embodiments of the present disclosure.

FIG. 4 shows a rolling cutter assembled to a rolling cutter pocket according to embodiments of the present disclosure.

FIG. 8 shows a rolling cutter, a rolling cutter pocket, and a retention pin according to embodiments of the present disclosure.

FIG. 9 shows a rolling cutter assembled to a rolling cutter pocket according to embodiments of the present disclosure.

FIG. 12 shows a rolling cutter, a rolling cutter pocket, and a retention pin according to embodiments of the present disclosure.

FIG. 13 shows a cross-sectional view of a rolling cutter assembled to a rolling cutter pocket according to embodiments of the present disclosure.

FIG. 14 shows a rolling cutter assembled to a rolling cutter pocket according to embodiments of the present disclosure.

FIG. 15 shows a cross-sectional view of a rolling cutter assembled to a rolling cutter pocket according to embodiments of the present disclosure.

FIG. 16 shows a rolling cutter pocket according to embodiments of the present disclosure.

FIG. 17 shows a rolling cutter assembled to a rolling cutter pocket according to embodiments of the present disclosure.

FIG. 18 shows a rolling cutter, a rolling cutter pocket, and a retention pin according to embodiments of the present disclosure.

FIG. 19 shows a cross-sectional view of a rolling cutter assembled to a rolling cutter pocket according to embodiments of the present disclosure.

DETAILED DESCRIPTION

Figure 1:
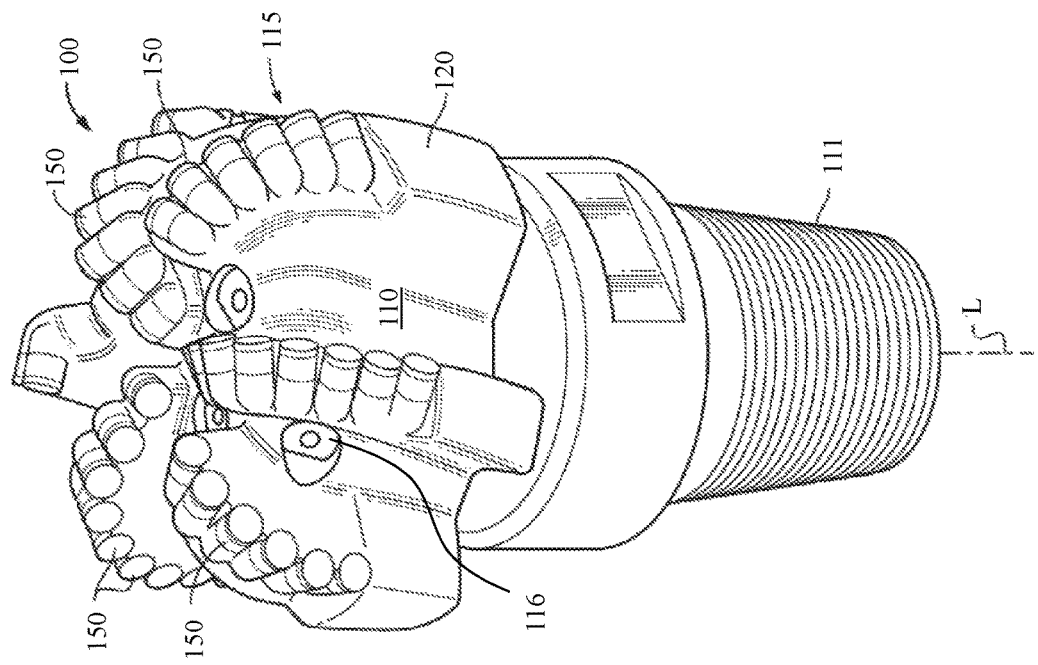
FIG. 1 shows a side view of a conventional drag bit.
Figure 2:
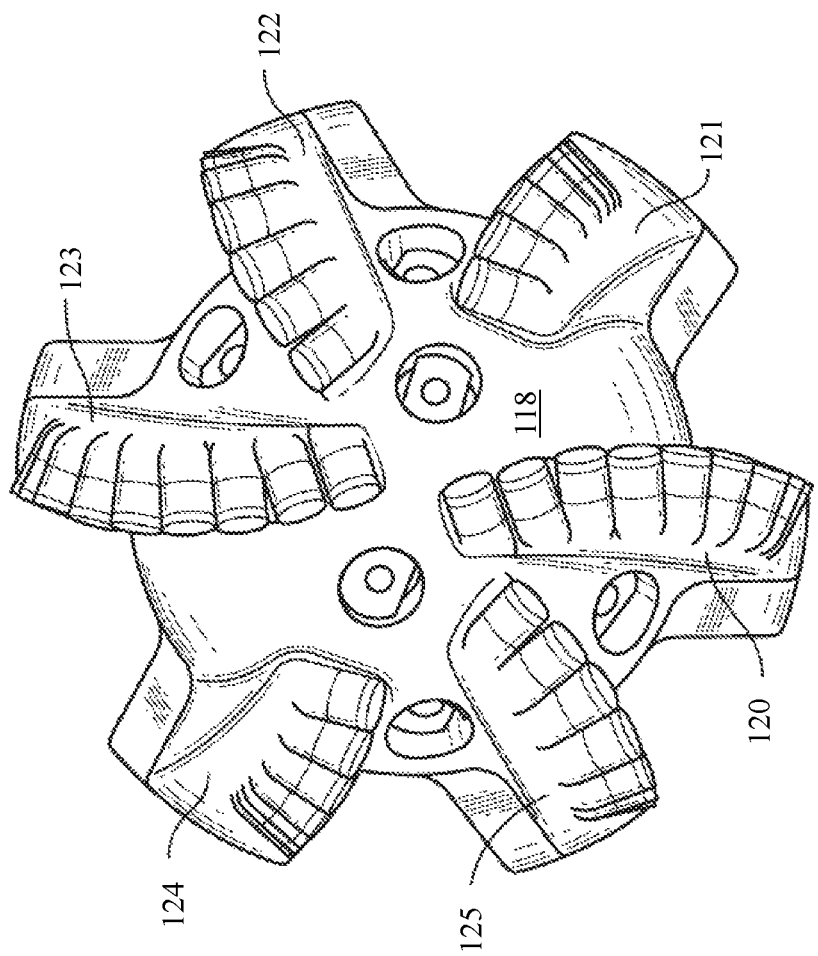
FIG. 2 shows a top view of a conventional drag bit.

In one aspect, embodiments disclosed herein relate to rolling cutters and methods of retaining such rolling cutters on a drill bit or other cutting tools. In some embodiments, rolling cutters may be retained on a fixed cutter drill bit by a retention pin or a WC sleeve and the side surface of a rolling cutter pocket, thus allowing the entire cutting face of a rolling cutter to be exposed. According to other embodiments, rolling cutters may be retained on a fixed cutter drill bit by only the side surface of a rolling cutter pocket.

Generally, cutting elements described herein allow at least one surface or portion of the cutting element to rotate as the cutting elements contact a formation. As the cutting element contacts the formation, the cutting action may allow portion of the cutting element to rotate around a cutting element rotational axis extending through the cutting element. Rotation of the cutting structure may allow a cutting surface to cut the formation using the entire outer edge of the cutting surface, rather than the same section of the outer edge, as observed in a conventional cutting element.

Referring to FIG. 3, a segment of a cutting tool 300 having a rolling cutter pocket 310 is shown. The rolling cutter pocket 310 has a back surface 312 and a side surface 314. Further, a lip 316 (protrusion) may be disposed on the side surface 314 of the rolling cutter pocket 310. The lip 316 may be integrally formed with the rolling cutter pocket, or the lip 316 may be attached to the side surface of the rolling cutter pocket. A rolling cutter 320 may be disposed within the rolling cutter pocket 310, wherein the rolling cutter 320 has a cutting face 322, a bottom surface 323 opposite from the cutting face 322, an outer circumferential surface 324, a circumferential channel 326 formed within the outer circumferential surface 324, and a cavity 328 extending at least partially along a rotational axis R through the rolling cutter 320 from the bottom surface 323 of the rolling cutter 320. The circumferential channel 326 may be formed around the outer circumferential surface 324 of the rolling cutter 320, for example, during formation of the rolling cutter (such as in a mold) or after formation of the rolling cutter (such as by machining) depending on the material of the rolling cutter. Likewise, the cavity 328 may be formed, for example, during formation of the rolling cutter or after formation of the rolling cutter (such as by plunge EDM (Electrical Discharge Machining) or laser cutting), depending on the depth of the cavity and the material of the rolling cutter. A retention pin 330 may be disposed within the cavity 328 of the rolling cutter 320. FIG. 4 shows the rolling cutter 320 and the retention pin 330 shown in FIG. 3 assembled within the rolling cutter pocket 310 formed in the cutting tool 300, wherein the circumferential channel 326 mates with the lip 316. The cross section of the lip 316 is a half circle, which may have a radius ranging from 0.030" to 0.150". The cross section of the channel 326 is a slightly larger half circle, which may have a radius of 0.001" to 0.010" greater than the lip. In order to help rotation, diamond like carbon coating (DLC) may be applied on rolling cutter pocket surfaces in order to reduce friction and improve wear resistance.

According to some embodiments of the present disclosure, a rolling cutter pocket may have a channel formed in the side surface of the rolling cutter pocket, and a rolling cutter may have a corresponding lip formed around the outer circumferential surface of the rolling cutter. The rolling cutter may be assembled within the rolling cutter pocket such that the channel formed in the rolling cutter pocket mates with the lip formed around the outer circumferential surface of the rolling cutter. In other embodiments, more than one mating pairs of a lip and channel may be formed in a rolling cutter assembled to a rolling cutter pocket. For example, a rolling cutter may have a lip and a channel formed around the outer circumferential surface of the rolling cutter. The rolling cutter having both a lip and a channel may be assembled to a rolling cutter pocket having a corresponding channel and a corresponding lip formed within the side surface of the rolling cutter pocket. However, it is within the scope of the present disclosure that embodiments may have different combinations of one or more mating pairs of a lip and a channel formed in a rolling cutter assembled to a rolling cutter pocket.

Further, cutting tools having a rolling cutter pocket formed therein may include, for example, a drill bit, a reamer, or a hybrid bit. For example, a drill bit may have a bit body and a plurality of blades extending radially from the bit body, wherein each blade has a leading face, a trailing face, and a top face. At least one rolling cutter pocket may be disposed on one or more of the bit blades at the leading face of each blade. For example, a rolling cutter pocket may be formed at the leading face of a blade, such that when a rolling cutter is disposed therein, the rolling cutter is exposed at the leading face and the top face of the blade.

Figure 5:
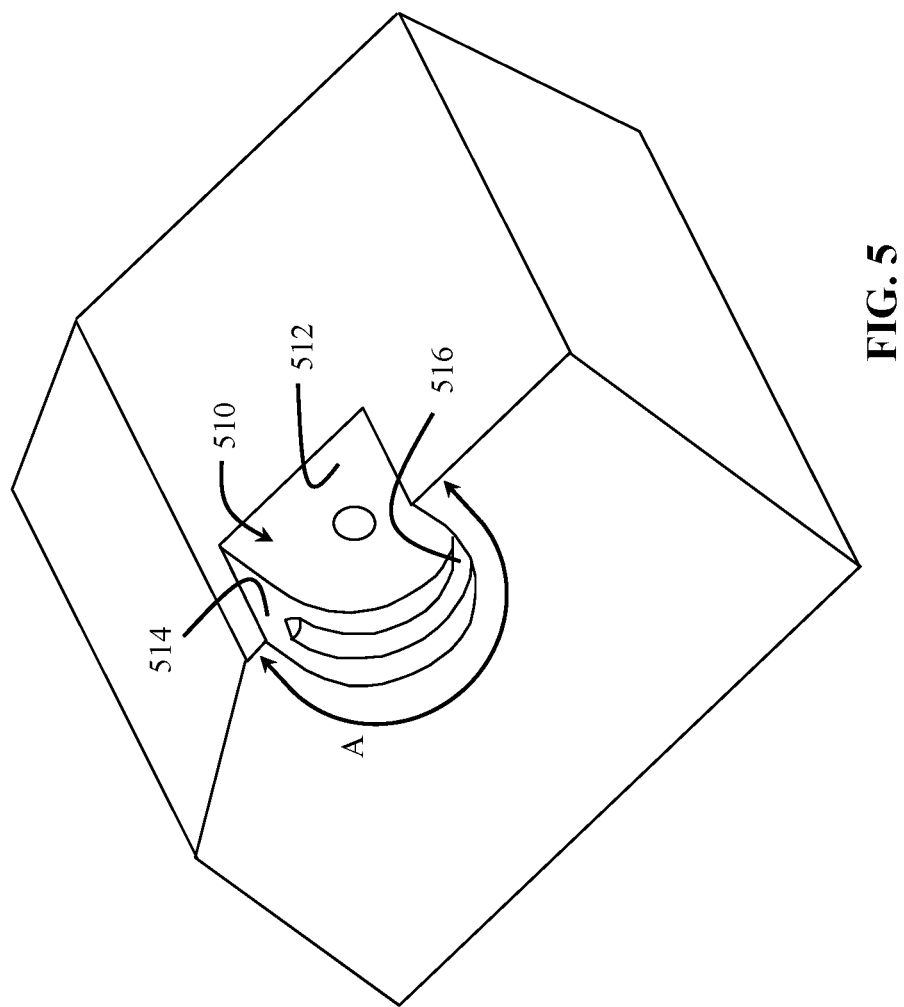
FIG. 5 shows a rolling cutter pocket according to embodiments of the present disclosure.

Rolling cutter pockets according to embodiments of the present disclosure may have a side surface that forms a partial cylindrical shape, or an arc profile. The arc defined by a rolling cutter pocket side surface may extend 180 degrees or less. For example, FIG. 5 shows a rolling cutter pocket 510 according to embodiments of the present disclosure having a back surface 512 and a side surface 514. As shown, the side surface 514 forms an arc A equal to about 180 degrees. However, other embodiments may have a side surface forming an arc equal to less than 180 degrees. Advantageously, in some embodiments having a side surface extending 180 degrees or less, a rolling cutter may be loaded into the rolling cutter pocket from the top face of the pocket (top loading) as opposed to loading the rolling cutter into the pocket from the leading face of the pocket (i.e., the opening in the pocket that faces the leading side of a cutting tool, such as a bit blade, in the direction of cutting). Further, in some embodiments having a side surface extending 180 degrees or less, a larger portion of the rolling cutter may be exposed to the formation being drilled when compared to, for example, cutting elements disposed in cutter pockets with side surfaces extending more than 180 degrees.

Figure 6:
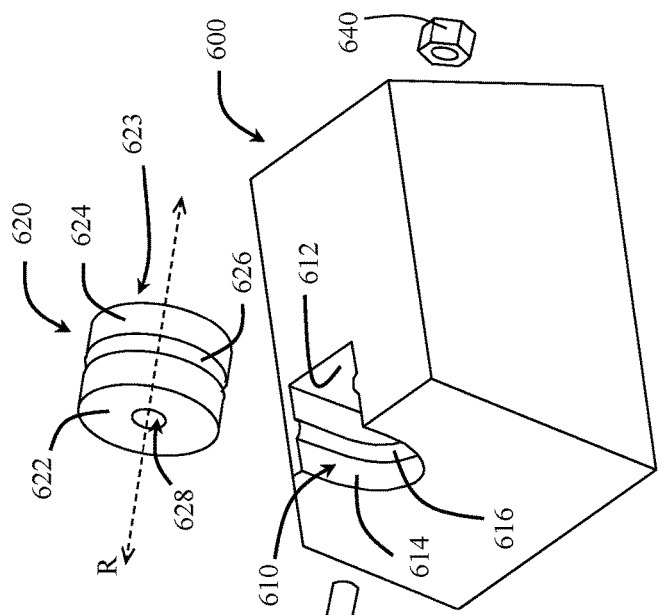
FIG. 6 shows a rolling cutter and a rolling cutter pocket according to embodiments of the present disclosure.

Referring still to FIG. 5, a lip 516 may be formed along the side surface 514 of the rolling cutter pocket 510 such that the lip 516 is substantially parallel with and a distance from the back surface 512 of the rolling cutter pocket 510. The lip 516 may extend partially along the arc A of the side surface 514 (as shown in FIG. 5), or the lip may extend along the entire arc A of the side surface (as shown in FIGS. 3 and 6). The arc angle of the lip may be less than or equal to 180 degrees and greater than 60 degrees.

Figure 7:
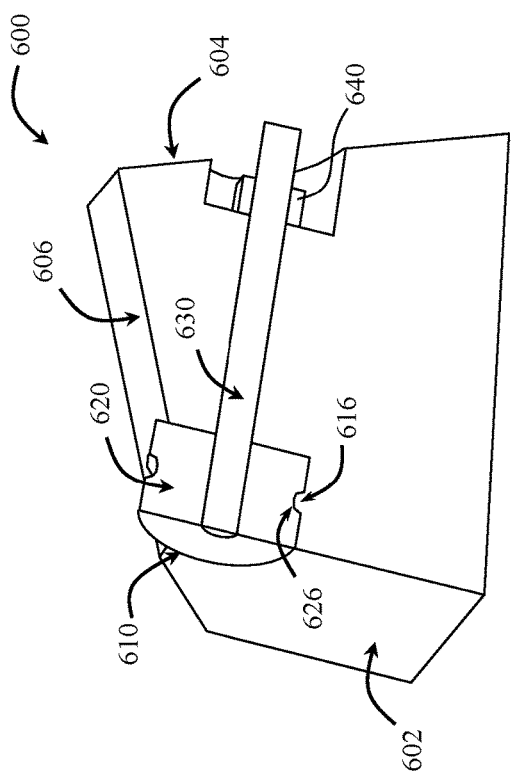
FIG. 7 shows a cross-sectional view of a rolling cutter and a rolling cutter pocket according to embodiments of the present disclosure.

Referring now to FIGS. 6 and 7, a rolling cutter 620 and a rolling cutter pocket 610 according to embodiments of the present disclosure are shown. The rolling cutter pocket 610 may be disposed on a bit blade 600 having a leading face 602, a trailing face 604, and a top face 606, wherein the rolling cutter pocket 610 is formed at the leading face 602 of the blade 600. The rolling cutter pocket 610 has a back surface 612 and a side surface 614. Further, a lip 616 may be disposed on the side surface 614 of the rolling cutter pocket 610. The lip 616 may be integrally formed with the rolling cutter pocket, or the lip 616 may be attached to the side surface of the rolling cutter pocket. A rolling cutter 620 may be disposed within the rolling cutter pocket 610, wherein the rolling cutter 620 has a cutting face 622, a bottom surface 623 opposite from the cutting face 622, an outer circumferential surface 624, a circumferential channel 626 formed within the outer circumferential surface 624, and a cavity 628 extending at least partially along a rotational axis R through the rolling cutter 620 from the bottom surface 623 of the rolling cutter.

A retention pin 630 may be disposed within the cavity 628 of the rolling cutter 620 and extend through the blade 600, from the rolling cutter pocket back surface 612 to the trailing face 604 of the blade 600. The retention pin 630 may be attached to the blade 600 so that the retention pin 630 is fixed to the blade and the rolling cutter 620 rotates about the retention pin 630. For example, a bolt 640 may be used to attach the retention pin 630 to the blade 600, wherein the bolt 640 is threaded to the retention pin 630 at the trailing face of the blade 600. The bolt 640 and/or retention pin 630 may be fixed to the blade 600 such as by interference fitting the retention pin 630 within the blade or by welding, for example. A retention pin may also be attached to a blade by other means known in the art, or may be formed integrally with the blade. Further, a retention pin may be prevented from rotating (so that a rolling cutter rotates about a fixed retention pin) by forming non-cylindrical mating portions of the retention pin and blade. For example, a retention pin may have a non-cylindrical portion formed at the portion of the retention pin positioned proximate to the trailing face of the blade. A hole formed in the blade to receive the retention pin may have a mating non-cylindrical portion formed proximate to the trailing face of the blade. In such embodiments, the retention pin may be inserted through the trailing face of the blade into the blade hole and rolling cutter cavity, such that the mating non-cylindrical portions of the retention pin and the blade hole prevent retention pin rotation while at the same time, the remaining cylindrical portions of the retention pin allow for a rolling cutter to rotate about the retention pin. FIG. 7 shows the rolling cutter 620 and the retention pin 630 shown in FIG. 6 assembled within the rolling cutter pocket 610 formed in a bit blade 600, wherein the circumferential channel 626 mates with the lip 616.

Rolling cutters according to embodiments of the present disclosure may be retained within a rolling cutter pocket by the rolling cutter pocket side surface and a retention pin. The side surface retention mechanism (mating lip and circumferential channel) may retain the rolling cutter axially within the rolling cutter pocket, while the retention pin may inhibit the rolling cutter from being dislodged (pulled out from the top face) from the rolling cutter pocket. Advantageously, by using a retention pin to retain a rolling cutter within a rolling cutter pocket, the entire cutting face of the rolling cutter may be exposed to the formation being drilled, as opposed to cutting elements that have a retention system that covers part of the cutting face of the cutter.

Figure 10:
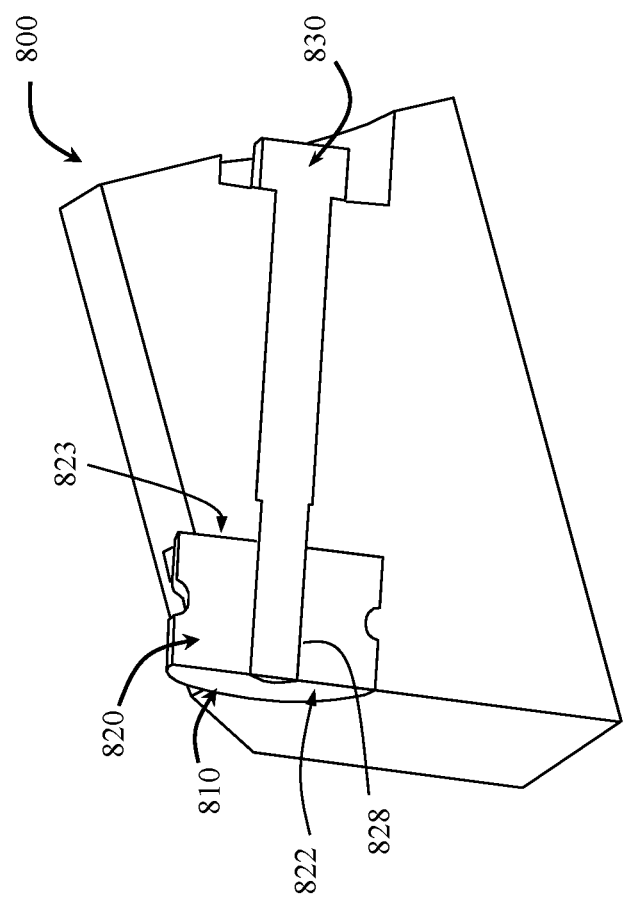
FIG. 10 shows a cross-sectional view of a rolling cutter assembled to a rolling cutter pocket according to embodiments of the present disclosure.

FIGS. 8-10 show a segment of a bit blade 800 having a rolling cutter pocket 810 formed therein. The rolling cutter pocket 810 has a back surface 812 and a side surface 814. Further, a lip 816 may be disposed on the side surface 814 of the rolling cutter pocket 810. The lip 816 may be integrally formed with the rolling cutter pocket, or the lip 816 may be attached, such as by brazing, to the side surface of the rolling cutter pocket. A rolling cutter 820 may be disposed within the rolling cutter pocket 810, wherein the rolling cutter 820 has a cutting face 822, a bottom surface 823 opposite the cutting face 822, an outer circumferential surface 824, a circumferential channel 826 formed within the outer circumferential surface 824, and a cavity 828 extending at least partially along a rotational axis R, from the bottom surface 823 through the rolling cutter 820. A retention pin 830 may be disposed within the cavity 828 of the rolling cutter 820 and attached to the blade 800 by a threaded connection. FIG. 9 shows the rolling cutter 820 and the retention pin 830 shown in FIG. 8 assembled within the rolling cutter pocket 810 formed in the cutting tool 800, wherein the circumferential channel 826 mates with the lip 816.

FIG. 10 shows a cross-sectional view of the rolling cutter 820 and the retention pin 830 shown in FIG. 8 assembled within the rolling cutter pocket 810. As shown, the cavity 828 extends along the rotational axis from the cutting face 822 to a back face 823 of the rolling cutter 820. The retention pin 830 may extend entirely through the cavity from the back face 823 to the cutting face 822, such that the portion of the retention pin 830 exposed at the cutting face side of the cavity 828 is flush with the cutting face 822. According to other embodiments, the retention pin may extend partially through the cavity from the back face of the rolling cutter, such that the retention pin is not flush with the cutting face (see, for example, FIGS. 13 and 19, described below).

Rolling cutters according to embodiments of the present disclosure may have at least one ultrahard material included therein. Such ultra hard materials may include a conventional polycrystalline diamond table (a table of interconnected diamond particles having interstitial spaces therebetween in which a metal component (such as a metal catalyst) may reside), a thermally stable diamond layer (i.e., having a thermal stability greater than that of conventional polycrystalline diamond, 750° C.) formed, for example, by removing substantially all metal from the interstitial spaces between interconnected diamond particles or from a diamond/silicon carbide composite, or other ultra hard material such as a cubic boron nitride. An ultrahard material layer may be formed on or attached to a substrate, which may be made of a metallic carbide material, such as a cemented or sintered carbide of one of the Group IVB, VB, and VIB metals, e.g., tungsten carbide, tantalum carbide, or titanium carbide, pressed or sintered in the presence of a binder, such as cobalt, nickel, iron, alloys thereof, or mixtures thereof.

Further, in particular embodiments, the rolling cutter may be formed entirely of ultrahard material(s), but the rolling cutter may include a plurality of diamond grades used, for example, to form a gradient structure (with a smooth or non-smooth transition between the grades). In a particular embodiment, a first diamond grade having smaller particle sizes and/or a higher diamond density may be used to form the upper portion of the rolling cutter (that forms the cutting edge when installed on a bit or other tool), while a second diamond grade having larger particle sizes and/or a higher metal content may be used to form the lower, non-cutting portion of the cutting element. Further, it is also within the scope of the present disclosure that more than two diamond grades may be used.

As known in the art, thermally stable diamond may be formed in various manners. A typical polycrystalline diamond layer includes individual diamond "crystals" that are interconnected. The individual diamond crystals thus form a lattice structure. A metal catalyst, such as cobalt, may be used to promote recrystallization of the diamond particles and formation of the lattice structure. Thus, cobalt particles are typically found within the interstitial spaces in the diamond lattice structure. Cobalt has a significantly different coefficient of thermal expansion as compared to diamond. Therefore, upon heating of a diamond table, the cobalt and the diamond lattice will expand at different rates, causing cracks to form in the lattice structure and resulting in deterioration of the diamond table.

To obviate this problem, strong acids may be used to "leach" the cobalt from a polycrystalline diamond lattice structure (either a thin volume or entire tablet) to at least reduce the damage experienced from heating diamond-cobalt composite at different rates upon heating. Examples of "leaching" processes can be found, for example, in U.S. Pat. Nos. 4,288,248 and 4,104,344. Briefly, a strong acid, typically hydrofluoric acid or combinations of several strong acids may be used to treat the diamond table, removing at least a portion of the co-catalyst from the PDC composite. Suitable acids include nitric acid, hydrofluoric acid, hydrochloric acid, sulfuric acid, phosphoric acid, or perchloric acid, or combinations of these acids. In addition, caustics, such as sodium hydroxide and potassium hydroxide, have been used to the carbide industry to digest metallic elements from carbide composites. In addition, other acidic and basic leaching agents may be used as desired. Those having ordinary skill in the art will appreciate that the molarity of the leaching agent may be adjusted depending on the time desired to leach, concerns about hazards, etc.

By leaching out the cobalt, thermally stable polycrystalline (TSP) diamond may be formed. In certain embodiments, only a select portion of a diamond composite is leached, in order to gain thermal stability without losing impact resistance. As used herein, the term TSP includes both of the above (i.e., partially and completely leached) compounds. Interstitial volumes remaining after leaching may be reduced by either furthering consolidation or by filling the volume with a secondary material, such by processes known in the art and described in U.S. Pat. No. 5,127,923, which is herein incorporated by reference in its entirety.

Alternatively, TSP may be formed by forming the diamond layer in a press using a binder other than cobalt, one such as silicon, which has a coefficient of thermal expansion more similar to that of diamond than cobalt has. During the manufacturing process, a large portion, 80 to 100 volume percent, of the silicon reacts with the diamond lattice to form silicon carbide, which also has a thermal expansion similar to diamond. Upon heating, any remaining silicon, silicon carbide, and the diamond lattice will expand at more similar rates as compared to rates of expansion for cobalt and diamond, resulting in a more thermally stable layer. PDC cutters having a TSP cutting layer have relatively low wear rates, even as cutter temperatures reach 1200° C. However, one of ordinary skill in the art would recognize that a thermally stable diamond layer may be formed by other methods known in the art, including, for example, by altering processing conditions in the formation of the diamond layer.

The substrate on which the cutting face is disposed may be formed of a variety of hard or ultra hard particles. In one embodiment, the substrate may be formed from a suitable material such as tungsten carbide, tantalum carbide, or titanium carbide. Additionally, various binding metals may be included in the substrate, such as cobalt, nickel, iron, metal alloys, or mixtures thereof. In the substrate, the metal carbide grains are supported within the metallic binder, such as cobalt. Additionally, the substrate may be formed of a sintered tungsten carbide composite structure. It is well known that various metal carbide compositions and binders may be used, in addition to tungsten carbide and cobalt. Thus, references to the use of tungsten carbide and cobalt are for illustrative purposes only, and no limitation on the type substrate or binder used is intended. In another embodiment, the substrate may also be formed from a diamond ultra hard material such as polycrystalline diamond and thermally stable diamond.

Figure 11:
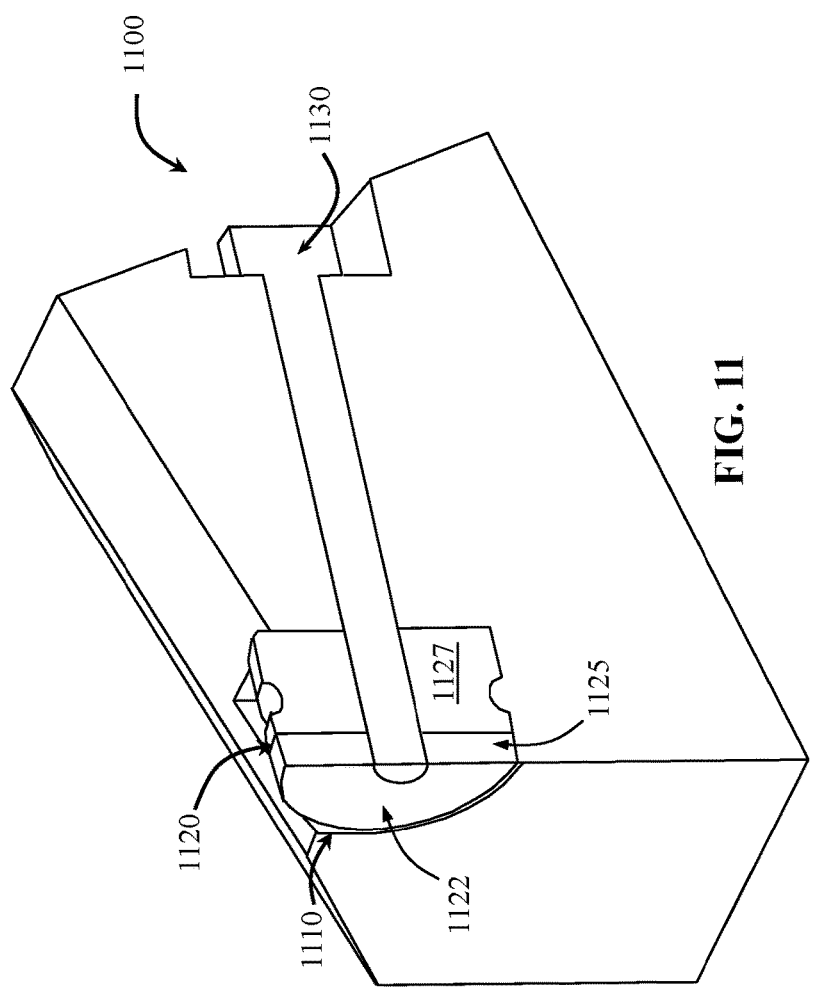
FIG. 11 shows a cross-sectional view of a rolling cutter assembled to a rolling cutter pocket according to embodiments of the present disclosure.

Referring to FIG. 11, a cross-sectional view of a rolling cutter 1120 and a retention pin 1130 assembled within a rolling cutter pocket 1110 according to embodiments of the present disclosure are shown. The rolling cutter 1120 has an ultrahard material table 1125, which forms the cutting face 1122, disposed on a substrate 1127. The ultrahard material table 1125 may be formed of ultrahard material described above, such as diamond, TSP, or cubic boron nitride, and the substrate 1127 may be formed of substrate material described above, such as metal carbides. While the illustrated embodiment shows the cutting face and substrate as two distinct pieces, one of skill in the art should appreciate that it is within the scope of the present disclosure the cutting face and substrate are integral, identical compositions. In such an embodiment, it may be preferable to have a single diamond composite forming the cutting face and substrate or distinct layers.

Referring now to FIGS. 12 and 13, a segment of a bit blade 1200 having a rolling cutter pocket 1210 formed therein is shown. The rolling cutter pocket 1210 has a back surface 1212 and a side surface 1214. Further, a lip 1216 may be disposed on the side surface 1214 of the rolling cutter pocket 1210. The lip 1216 may be integrally formed with the rolling cutter pocket, or the lip 1216 may be attached, such as by brazing, to the side surface of the rolling cutter pocket. A rolling cutter 1220 may be disposed within the rolling cutter pocket 1210, wherein the rolling cutter 1220 has a cutting face 1222, a back face 1223, an outer circumferential surface 1224, a circumferential channel 1226 formed within the outer circumferential surface 1224, and a cavity 1228 extending at least partially from the back face 1223, along a rotational axis R through the rolling cutter 1220. Further, the rolling cutter 1220 has an ultrahard material table 1225 formed on a substrate 1227, wherein the ultrahard material table 1225 forms the cutting face 1222 of the rolling cutter 1220. A retention pin 1230 may be disposed within the cavity 1228 of the rolling cutter 1220 and attached to the blade 1200 by a threaded connection.

FIG. 13 shows the rolling cutter 1220 and the retention pin 1230 shown in FIG. 12 assembled within the rolling cutter pocket 1210 formed in the cutting tool 1200, wherein the circumferential channel 1226 mates with the lip 1216. As shown, the retention pin 1230 extends partially through the cavity 1228 from a back face 1223 of the rolling cutter 1220 to the ultrahard material table 1225. According to embodiments of the present disclosure, a cavity may extend along the rotational axis of a rolling cutter a distance of at least 50 percent of the length of the rolling cutter from the back face of the rolling cutter, and up to the entire length of the rolling cutter. Further, a retention pin may extend a distance less than or equal to the length of the cavity. For example, in embodiments having a cavity extending the entire length of the rolling cutter (from the back face to the cutting face of the rolling cutter) along the rolling cutter rotational axis, a retention pin may also extend the entire length of the rolling cutter, such that an end of the retention pin is flush with the cutting face of the rolling cutter. Alternatively, in embodiments having a cavity extending the entire length of the rolling cutter (from the back face to the cutting face of the rolling cutter) along the rolling cutter rotational axis, a retention pin may extend a partial length of the rolling cutter from the back face, such that a portion of the cavity is exposed at the cutting face of the rolling cutter (e.g., shown in FIG. 19). In embodiments having a cavity extending a partial length of the rolling cutter from the rolling cutter back face, a retention pin may extend substantially the distance of the cavity, such that the retention pin and cavity terminate adjacent to each other. Alternatively, in embodiments having a cavity extending a partial length of the rolling cutter from the rolling cutter back face, a retention pin may extend a distance less than the length of the cavity, such that a gap is formed between where the retention pin and the cavity terminate. Additionally, retention pins and/or cavities of the present disclosure may include diamond or other low-friction material to provide bearing surfaces between a retention pin and rolling cutter. Further, the diameter of the pin may range from 0.100 inches to 0.3 inches.

According to embodiments of the present disclosure, a rolling cutter pocket may be formed in a cutting tool, such as in a blade of a drag bit. Drill bits formed from a matrix material may have the rolling cutter pockets formed in the blade by positioning rolling cutter place holders (displacements) into a bit mold, and then pouring the bit matrix material in the mold around the displacements. The displacements may have a circumferential channel formed therein to provide a mold of a lip for the rolling cutter pockets. Alternatively, the rolling cutter displacements may have no circumferential channel, and a lip may be added to the rolling cutter pockets after formation of the bit. Matrix material may include a mixture of a carbide compounds and/or a metal alloy using any technique known to those skilled in the art. For example, matrix materials may include at least one of macrocrystalline tungsten carbide particles, carburized tungsten carbide particles, cast tungsten carbide particles, sintered tungsten carbide particles, and unsintered or pre-sintered tungsten monocarbide. In other embodiments, non-tungsten carbides of vanadium, chromium, titanium, tantalum, niobium, silicon, aluminum or other transition metal carbides may be used. In yet other embodiments, carbides, oxides, and nitrides of Group IVA, VA, or VIA metals may be used. Typically, a binder phase may be formed from a powder component and/or an infiltrating component. In some embodiments of the present invention, hard particles may be used in combination with a powder binder such as cobalt, nickel, iron, chromium, copper, molybdenum and their alloys, and combinations thereof. Once the bit is formed and the placeholders removed, rolling cutters may then be placed into the rolling cutter pockets. Alternatively, drill bits formed from a steel bit body may have the rolling cutter pockets machined into the blades.

In embodiments having a lip formed on the rolling cutter pockets after manufacturing the cutting tool, the lip may be attached within a groove formed in the rolling cutter pocket. For example, referring to FIGS. 14-16, a segment of a bit blade 1400 has rolling cutter 1420 assembled within a rolling cutter pocket 1410 using a retention pin 1430, wherein the rolling cutter 1420 and the rolling cutter pocket 1410 have a mating circumferential channel 1426 and lip 1416, respectively. Particularly, the rolling cutter 1420 has a cutting face 1422, an outer circumferential surface 1424, a circumferential channel 1426 formed within the outer circumferential surface 1424, and a cavity 1428 extending at least partially along a rotational axis through the rolling cutter 1420. The rolling cutter pocket 1410 has a back surface 1412, a side surface 1414, and a lip 1416 disposed within a groove 1418 formed in the side surface 1414, wherein the lip 1416 is parallel with and a distance from the back surface 1412. The lip 1416 may be attached in the groove 1418 to the side surface 1414 of the rolling cutter pocket 1410 by brazing, for example. Further, the lip 1416 may extend partially around the side surface 1414 or entirely around the side surface (such that the lip intersects with the top face of the blade). The lip may be formed of the same or different material used to make the rolling cutter pocket, including, for example, a metal carbide or steel material. A retention pin 1430 may be disposed within the cavity 1428 of the rolling cutter 1420 and attached to the blade 1400 by a threaded connection.

Methods of manufacturing a drill bit according to embodiments disclosed here may include forming a bit body, as described above, wherein the bit body has a threaded pin end and a cutting end, and at least one blade extends radially from the cutting end of the bit body. A bit blade may have at least one rolling cutter pocket formed therein during the bit formation, or at least one rolling cutter pocket may be formed in a blade after bit formation. A rolling cutter may then be placed into each rolling cutter pocket, wherein the rolling cutter has a cutting face, an outer circumferential surface, a circumferential channel formed within the outer circumferential surface, and a cavity extending at least partially along a rotational axis through the rolling cutter. The rolling cutter may be retained in the rolling cutter pocket by a retention pin disposed within the cavity. In embodiments disclosed herein, a rolling cutter may also be retained in a rolling cutter pocket using a sidewall retention mechanism. Such sidewall retention mechanism may include mating a lip disposed within a side surface of the rolling cutter pocket with a circumferential channel formed within the outer circumferential surface of the rolling cutter. The lip may be attached to the rolling cutter pocket (such as by brazing) or integrally formed with the rolling cutter pocket.

According to some embodiments, a rolling cutter may be placed in a rolling cutter pocket prior to inserting the retention pin within the rolling cutter cavity. The retention pin may then be attached to the blade by a threaded connection. For example, in some embodiments, a threaded blind hole may be machined in a back surface of the rolling cutter pocket, and once the rolling cutter is placed in the rolling cutter pocket, a retention pin may be inserted through the rolling cutter cavity and threaded within the threaded blind hole (such that the retention pin is positioned within the cavity and the blind hole). In other embodiments, a threaded hole may be drilled entirely through the blade (or other cutting tool), such that a retention pin may be threaded through the blade and into the back surface/side of a rolling cutter. For example, as shown in FIG. 15, a threaded hole 1408 may be machined through a blade 1400, extending from a trailing side 1404 of the blade to a back surface 1412 of a rolling cutter pocket 1410. A rolling cutter 1420 may then be placed within the rolling cutter pocket 1410. A retention pin 1430 may be threaded through the threaded hole 1408, such that the retention pin 1430 also extends into a cavity 1428 of the rolling cutter 1420.

According to other embodiments, a rolling cutter may be placed in a rolling cutter pocket that has a retention pin integrally formed therein. The retention pin may be integrally formed with a blade or other cutting tool at a back surface of a rolling cutter pocket. In such embodiments, a partial sleeve may be assembled with the rolling cutter before placing the assembly within the rolling cutter pocket and around the retention pin.

For example, referring to FIGS. 17-19, a segment of a bit blade 1700 has rolling cutter 1720 assembled within a rolling cutter pocket 1710 using a retention pin 1730. Particularly, the rolling cutter 1720 has a cutting face 1722, an outer circumferential surface 1724, a circumferential channel 1726 formed within the outer circumferential surface 1724, and a cavity 1728 extending at least partially along a rotational axis through the rolling cutter 1720. The rolling cutter pocket 1710 has a back surface 1712 and a side surface 1714, wherein a receptacle 1715 (represented by the shaded area) is formed within the side surface 1714 to receive a partial sleeve 1740. The receptacle 1715 extends from the leading side 1702 of the blade 1700 a distance along the length of the rolling cutter pocket 1710 and a radial distance around the side surface of the rolling cutter pocket 1710. A partial sleeve 1740 may be positioned adjacent to the rolling cutter 1720, such that the partial sleeve 1740 extends partially around the outer circumferential surface 1724 of the rolling cutter 1720. Further, the partial sleeve 1740 may have a lip 1746 formed thereon that mates with the circumferential channel 1726 of the rolling cutter 1720. The rolling cutter 1720 and the partial sleeve 1740 may then be inserted into the rolling cutter pocket 1710, around a retention pin 1730 integrally formed with the rolling cutter pocket 1710. Particularly, the retention pin 1730 extends from the back surface 1712 of the rolling cutter pocket 1710 and at least partially through the cavity 1728 of the rolling cutter 1720. The partial sleeve 1740 may be attached within the receptacle 1715 within the rolling cutter pocket 1710 to form part of the rolling cutter pocket side surface 1714, wherein the rolling cutter 1720 may rotate within the rolling cutter pocket 1710 and partial sleeve 1740.

Figure 24:
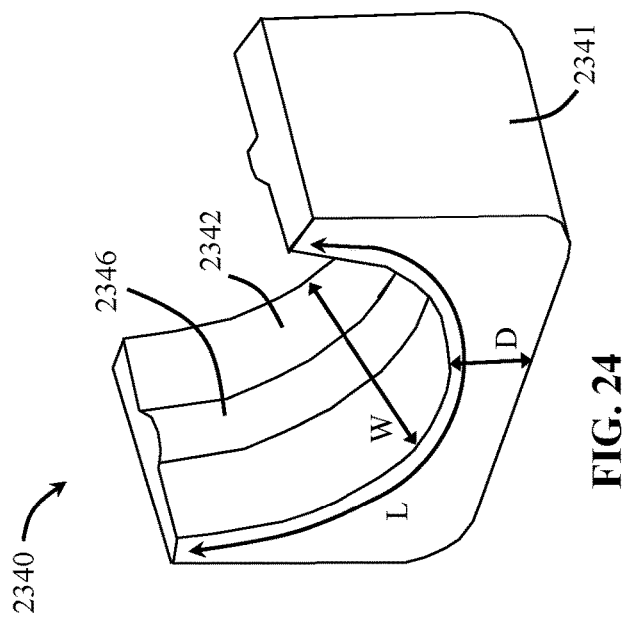
FIG. 24 shows a partial sleeve according to embodiments of the present disclosure.
Figure 23:
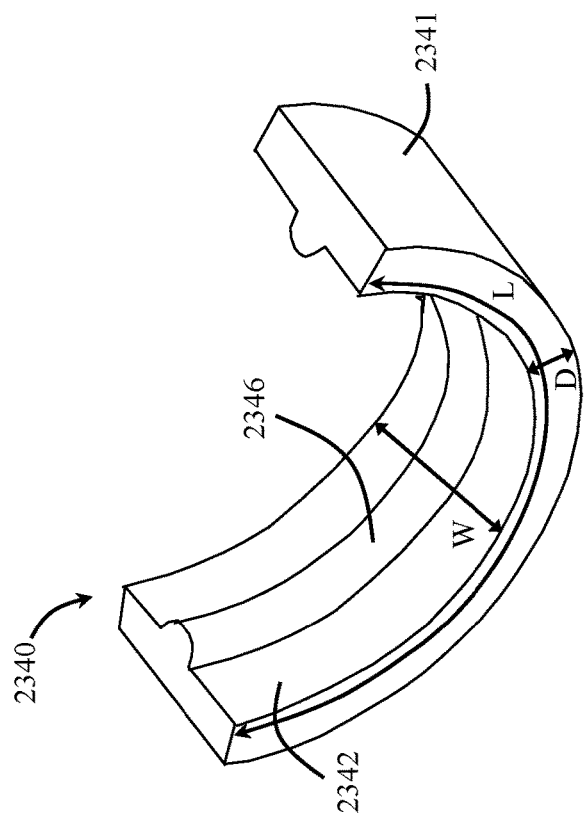
FIG. 23 shows a partial sleeve according to embodiments of the present disclosure.

Further, the shape of a partial sleeve and a corresponding receptacle may vary. For example, as shown in FIGS. 23 and 24, two partial sleeves according to embodiments of the present disclosure are shown. A partial sleeve 2340 has a lower surface 2341 and an upper surface 2342, wherein the upper surface 2342 is positioned adjacent to a rolling cutter and forms at least part of the side surface of a rolling cutter pocket once inserted into a rolling cutter pocket receptacle. Particularly, the upper surface 2342 of a partial sleeve 2340 may have an arc shape, which extends around part of the circumference of a rolling cutter once the partial sleeve 2340 is assembled with a rolling cutter. Further, as described above, the upper surface 2342 of a partial sleeve 2340 may have at least one lip 2346 (and/or at least one channel) formed thereon. The shape of a partial sleeve may be described with reference to its width W (the distance the partial sleeve extends from a leading face of a blade into the rolling cutter pocket), depth D (the distance between the upper surface of the partial sleeve to the lower surface of the partial sleeve), and arc length L (the distance around the arc of the upper surface). As shown in FIG. 23, the depth D of the partial sleeve 2340 may extend a constant distance from the upper surface 2342 to the lower surface 2341 of the partial sleeve 2340, as measured around the arc length L. Thus, in such embodiments, the cross-sectional shape along the length of the partial sleeve 1740 may be an arc, or partial-circular shape. Alternatively, as shown in FIG. 24, the depth D of the partial sleeve 2340 may extend a varying distance from the upper surface 2342 to the lower surface 2341 of the partial sleeve 2340, as measured around the arc length L. In such embodiments, the cross-sectional shape along the length of the partial sleeve may be irregular shapes. Additionally, the width W of a partial sleeve 2340 may constant or varying, as measured around the arc length L. One skilled in the art may appreciate that receptacles according to embodiments of the present disclosure may have corresponding shapes to the partial sleeve shapes described above. Particularly, a receptacle may have a negative shape (i.e., the shape of the void, or empty space) that mates with a corresponding partial sleeve.

Partial sleeves may be formed of a carbide material, such as tungsten carbide, or high strength tool steel alloys. In some embodiments, a partial sleeve may be formed of the same material as the cutter pocket, while in other embodiments, a partial sleeve may be formed of a different material than the cutter pocket.

Figure 20:
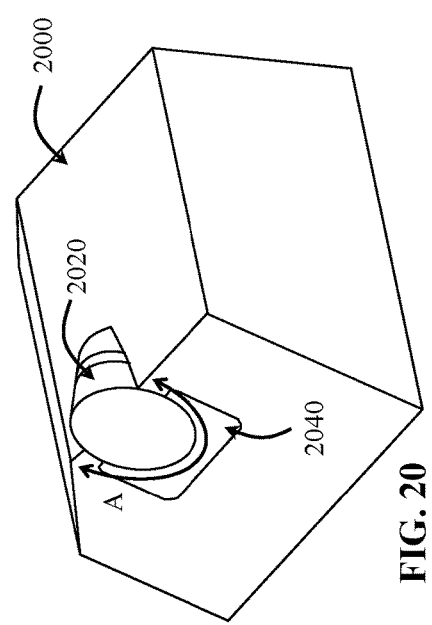
FIG. 20 shows a rolling cutter assembled to a rolling cutter pocket according to embodiments of the present disclosure.
Figure 22:
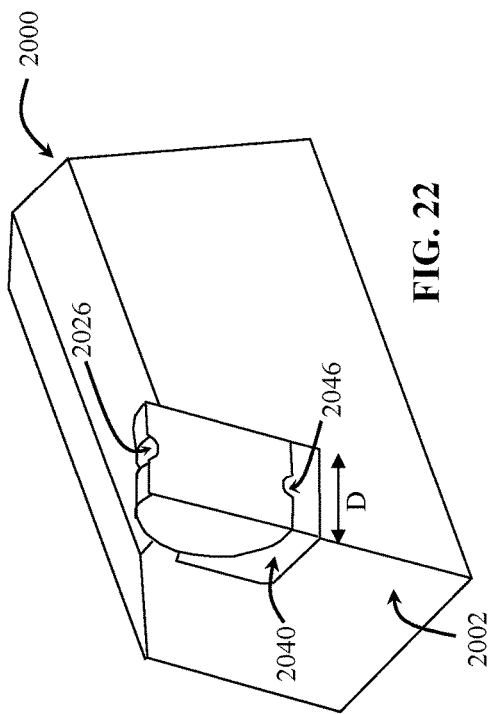
FIG. 22 shows a cross-sectional view of a rolling cutter assembled to a rolling cutter pocket according to embodiments of the present disclosure.
Figure 21:
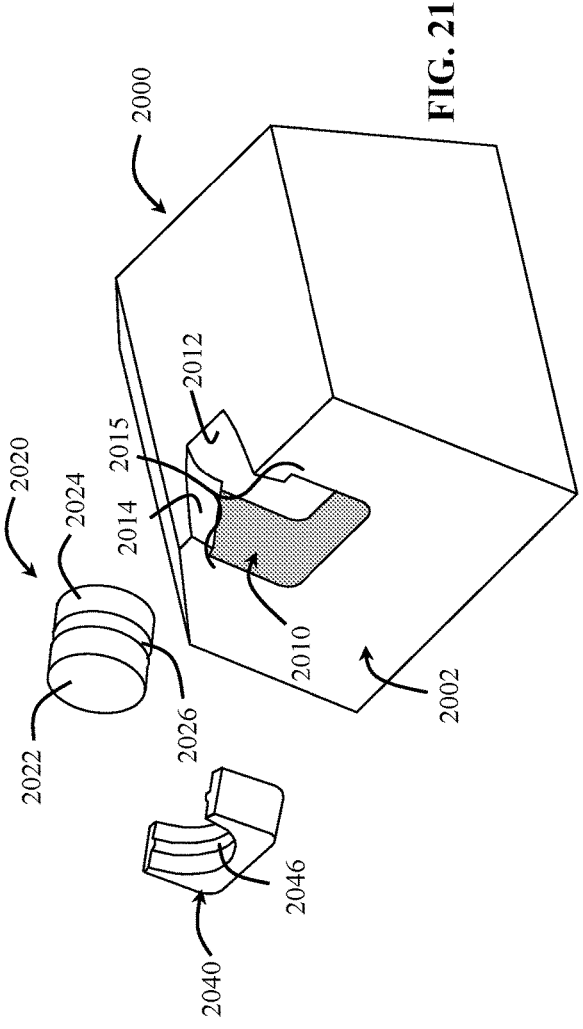
FIG. 21 shows a rolling cutter and a rolling cutter pocket according to embodiments of the present disclosure.

According to yet other embodiments, a rolling cutter may be retained in a rolling cutter pocket without the use of a retention pin. For example, referring to FIGS. 20-22, a segment of a bit blade 2000 has a rolling cutter 2020 assembled within a rolling cutter pocket 2010. Particularly, the rolling cutter 2020 has a cutting face 2022, an outer circumferential surface 2024, and a circumferential channel 2026 formed within the outer circumferential surface 2024. The rolling cutter pocket 2010 has a back surface 2012 and a side surface 2014, wherein a receptacle 2015 (represented by the shaded area) is formed within the side surface 2014 to receive a partial sleeve 2040. The receptacle 2015 extends from the leading side 2002 of the blade 2000 a distance D along the length of the rolling cutter pocket 2010 and a radial distance around the side surface of the rolling cutter pocket 2010. A partial sleeve 2040 may be positioned adjacent to the rolling cutter 2020, such that the partial sleeve 2040 extends partially around the outer circumferential surface 2024 of the rolling cutter 2020. Further, the partial sleeve 2040 may have a lip 2046 formed thereon that mates with the circumferential channel 2026 of the rolling cutter 2020. The rolling cutter 2020 and the partial sleeve 2040 may then be inserted into the rolling cutter pocket 2010. The partial sleeve 2040 may be attached to the rolling cutter pocket 2010 to form part of the rolling cutter pocket side surface, wherein the rolling cutter 2020 may rotate within the rolling cutter pocket 2010 and partial sleeve 2040. Methods of attaching the partial sleeve 2040 to the rolling cutter pocket 2010 may include, for example, brazing, welding, mechanical locking, or other means known in the art.

As shown, the partial sleeve 2040 and the rolling cutter pocket side surface 2014 may form an arc A. The arc may extend around the rolling cutter 2020 greater than 180 degrees. Advantageously, in some embodiments having an arc extending greater than 180 degrees, a rolling cutter may be retained within a rolling cutter pocket using only the sidewall of the rolling cutter pocket. For example, a side wall retention mechanism (the mating lip formed along the rolling cutter pocket side wall and circumferential channel formed within the rolling cutter) may retain the rolling cutter axially within the rolling cutter pocket, while the extension of the rolling cutter pocket side wall greater than 180 degrees may inhibit the rolling cutter from being dislodged (pulled out from the top face) from the rolling cutter pocket.

Further, design modifications including, for example, side rake and back rake may be included in various combinations not limited to those described above in the rolling cutters of the present disclosure. In one embodiment, a cutter may have a side rake ranging from 0 to ±45 degrees. In another embodiment, a cutter may have a back rake ranging from about 5 to 35 degrees. A rolling cutter may be positioned on a blade with a selected back rake to assist in removing drill cuttings and increasing rate of penetration. A cutter disposed on a drill bit with side rake may be forced forward in a radial and tangential direction when the bit rotates. In some embodiments, because the radial direction may assist the movement of rolling cutters, such rotation may allow greater drill cuttings removal and provide an improved rate of penetration. As a cutting element contacts formation, the rotating motion of the cutting element may be continuous or discontinuous. For example, when the cutting element is mounted with a determined side rake and/or back rake, the cutting force may be generally pointed in one direction. Providing a directional cutting force may allow the cutting element to have a continuous rotating motion, further enhancing drilling efficiency.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A cutting tool, comprising:
   a tool body;
   at least one blade extending radially from the tool body;
   at least one pocket in the at least one blade;
   a rolling element retained in the at least one pocket such that the rolling element is free to rotate about an axis of the rolling element and such that a full length of the rolling element extends beyond adjacent portions of a top face of the at least one blade, wherein the full length of the rolling element is exposed.

2. The cutting tool of claim 1, wherein the rolling element is retained within the at least one pocket by a retention that extends greater than 180 degrees and less than 360 degrees around the rolling element.

3. The cutting tool of claim 1, wherein the rolling element comprises distinct layers of a diamond composite.

4. The cutting tool of claim 1, wherein less than 180 degrees and greater than 60 degrees of an edge between an end face and a side surface of the rolling element extends beyond the top face and is exposed.

5. The cutting tool of claim 1, wherein the rolling element has two end faces and a side surface extending between the two end faces, and a full length of the side surface and at least a portion of each of the two end faces extends beyond the top face.

6. The cutting tool of claim 1, wherein the rolling element is retained within the at least one pocket by a retention that at least engages the rolling element along a side surface of the rolling element.

7. A cutting tool, comprising:
   a tool body;
   at least one blade extending radially from the tool body;
   at least one pocket in the at least one blade;
   a rolling element having two end faces retained in the at least one pocket such that the rolling element is free to rotate about an axis of the rolling element and such that a portion of each of the two end faces extends beyond adjacent portions of a top face of one of the plurality of blades, wherein the portion of each of the two end faces is exposed.

8. The cutting tool of claim 7, wherein the rolling element is retained within the at least one pocket by a retention mechanism that extends greater than 180 degrees and less than 360 degrees around the rolling element.

9. The cutting tool of claim 7, wherein the rolling element comprises distinct layers of a diamond composite.

10. The cutting tool of claim 7, wherein less than 180 degrees and greater than 60 degrees of an edge between at least one of the two end faces and a side surface of the rolling element extends beyond the top face.

11. The cutting tool of claim 7, wherein the rolling element is retained within the at least one pocket by a retention mechanism that engages the rolling element along at least a side surface of the rolling element.

12. A cutting tool, comprising:
   a tool body;
   at least one blade extending radially from the tool body;
   at least one pocket in the at least one blade;
   a rolling element retained in the at least one pocket by a retention that extends greater than 180 degrees and less than 360 degrees around the rolling element such that the rolling element is free to rotate about an axis of the rolling element,
   wherein the retention includes a lip disposed on a side surface of the at least one pocket.

13. The cutting tool of claim 12, wherein the retention includes a partial sleeve.

14. The cutting tool of claim 13, wherein the retention includes the partial sleeve and the at least one pocket.

15. The cutting tool of claim 12, wherein the retention includes at least two elements that retain the rolling element within the at least one pocket.

16. The cutting tool of claim 12, wherein the retention is brazed to the at least one blade.

17. The cutting tool of claim 12, wherein the retention is mechanically locked to the at least one blade.

18. The cutting tool of claim 12, wherein the retention engages the rolling element along at least a side surface of the rolling element.

19. The cutting tool of claim 12, wherein the tool body is a drill bit body.

20. The cutting tool of claim 12, wherein the rolling element is a rolling cutting element.

* * * * *